Sept. 2, 1969 H. M. MADDOX ET AL 3,465,300

COMPUTER OPERATION RECOVERY AFTER INTERFERENCE

Filed Feb. 13, 1967 3 Sheets-Sheet 1

INVENTORS
HOWARD M. MADDOX
ARIE W. POLDERVAART

BY Robert G. Rogers

ATTORNEY

INVENTORS
HOWARD M. MADDOX
ARIE W. POLDERVAART
BY Robert G Boyer
ATTORNEY

INVENTORS
HOWARD M. MADDOX
ARIE W. POLDERVAART
BY Robert G Rogers
ATTORNEY

United States Patent Office 3,465,300
Patented Sept. 2, 1969

3,465,300
COMPUTER OPERATION RECOVERY AFTER INTERFERENCE

Howard M. Maddox, Anaheim, and Arie W. Poldervaart, Orange, Calif., assignors to North American Rockwell Corporation, a corporation of Delaware Filed Feb. 13, 1967, Ser. No. 615,787
Int. Cl. G11b *27/36*
U.S. Cl. 340—172.5 6 Claims

ABSTRACT OF THE DISCLOSURE

A system usable by serial computers for storing the logical states of all independent flip flops at the beginning of each computer word time, including logic for storing a pulse for synchronizing reading the stored flip flops. The system also includes logic for, in effect, erasing the stored information if no computer interruption occurs during the word time in which the information is stored. The sync pulse is erased and the flip flop information is written over. The system further comprises logic for detecting an interference condition, for disabling the erase logic, and logic for restoring the independent flip flops to their logical states before the normal operation is restored following an interruption. The system further provides for the synchronization of the return to normal operations such that the contents of the recirculating loops may be recovered.

BACKGROUND OF THE INVENTION

Field of the invention

The invention relates to a serial computer system for restoring flip flops to their logical states after an interference has interrupted computer operation by storing the logical state of all independent flip flops at the beginning of each computer word time with a pulse for synchronizing the restoring operation.

Description of prior art

In one prior art system, the logical states of all flip flops were stored after the detection of an interference in computer operation. In other words, detectors were provided for testing against power transients, temperature, and other conditions which would cause normal computer operation to be interrupted. After detection of an interrupt condition, the critical flip flops of the computer would be stored and subsequently normal computer operation resumed.

The difficulty with such a system is that after interrupt condition is detected, the storage operation is required in the presence of the adverse conditions and in many instances, the information is not recorded properly. As a result, if certain of the logical states of the flip flops did not become recorded or if they were recorded at an incorrect address due to the computer interruption, normal computer operation could not be resumed after the interruption.

Desirably, a system should be provided wherein, regardless of the time between a detected interruption and the time the computer halts, all the information contained in the independent flip flops could be stored. Following the interruption, logic should be provided for restoring all the independent flip flops to their former states so that normal computer operation could be resumed without unnecessary delays. Desirably, this system should not utilize excessive storage space in protecting the operation of the computer against an interference.

SUMMARY OF THE INVENTION

Briefly, the invention comprises a system for storing the logical states of all flip flops which are not dependent on constant conditions or upon other flip flops at the beginning of each computer word time. Such flip flops are called independent flip flops in the description. At the end of each word time, which may be 24 binary bits in duration, the state may be erased, for example, by being written over, and a new state corresponding to the new word time is stored. For example, a computer state at the beginning of a word time may be a logical "one." The logical "one" is stored until the end of that word time, at which time it is ignored and the new computer state, which for example may be a zero, is stored. If the computer operation is interrupted, the stored information is used to re-set all the independent flip flops to their previous logical state. As a result, normal computer operation can continue after interruption.

After all the states of the flip flops have been stored during a word time, a synchronizing pulse is stored in a separate channel. It is also erased during the following word time unless an interruption is detected. The synchronizing pulse is used to initiate a computer recovery cycle after the interruption is over.

Therefore, an object of this invention is to provide an improved system usable with serial type computers for restoring normal computer operation after an interruption.

A further object of this invention is to provide an improved system for storing independent flip flops in a serial computer before an interruption is detected and for restoring normal operation following interruption.

A still further object of this invention is to provide an improved serial computer system for storing independent flip flops and a synchronizing pulse for resuming normal computer operation after an interruption is over.

These and other objects of this invention will become more apparent in connection with the following drawings.

DESCRIPTION OF THE PREFERRED EMBODIMENTS

Figure 1:
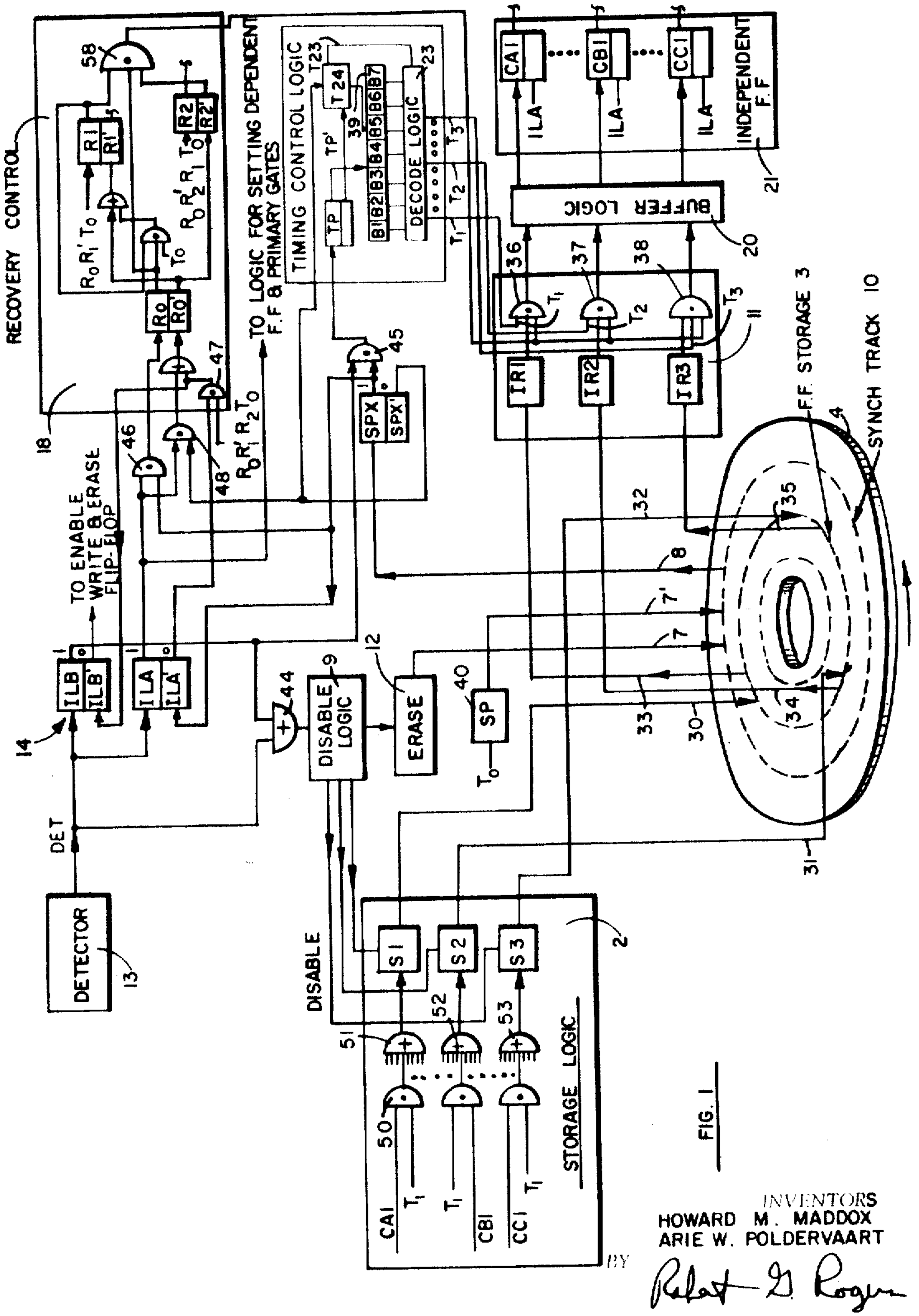
FIGURE 1 illustrates one embodiment of a system for restoring computer operation after interference.

Referring now to FIGURE 1, wherein is shown one embodiment of a system for restoring normal computer operation after an interruption. The system comprises storage logic 2 for storing the logical states of all independent flip flops on the flip flop storage track 3 of disc 4.

Logic 2 includes plurality of AND gates 50, each receiving an input from an independent flip flop $CA_1$ . . . $CB_1$ . . . $CC_1$ . . . and a timing signal input T1. The independent flip flops are designated generally by the numeral 21 in FIGURE 1. The AND gate outputs are ORed together by OR gates 51, 52, and 53 which provide inputs to storage flip flops S1, S2, and S3.

The timing signals generated by decode logic 23 in timing control logic 17 comprise 27 equally spaced pulses, TX, T0, and T1 through T24, and TP. A particular flip flop state is stored when a particular timing pulse is true. For example, when timing pulse T1 is true, the "1" designated flip flops ($CA_1$, $CB_1$, $CC_1$) are stored and when timing pulse T2 is true, the "2" designated flip flops ($CA_2$, $CB_2$, $CC_2$—not shown) are stored. The process is repeated for other flip flops corresponding to the other timing pulses 3–24. Timing pulses TP, TX and T0 are used during the recovery mode after an interference as described subsequently.

Independent flip flops are assumed to be those flip flops which are not dependent on constant conditions or other flip flops for their proper state. Ordinarily, such flip flops may be determined by an examination of the logic of a particular computer. For the embodiment described, flip flops $CA_1$, $CB_1$, $CC_1$, etc. are selected as typical independent flip flops.

The flip flop storage track 3 may comprise three storage locations each having at a length of one computer word. The number and length of the storage locations may be changed depending on the number of flip flops to be stored. Space must be provided for storing all independent flip flops during one computer word. For example, a computer word may be 24 bits in length. If it is determined that there are 72 independent flip flops, then a storage location must comprise three words of at least 24 bits each. Storage flip flops S1, S2 and S3 are connected to three write heads 30, 31, and 32, (represented by arrows pointed away from disc 4) disposed around the storage track 3 at equally spaced one word intervals. The independent flip flops $CA_1 \ldots CB_1 \ldots$ and $CC_1 \ldots$, may be divided into three equal groups so that flip flop S1 stores the states of the first group. S2 stores the flip flops of the second group and S3 stores the flip flops of the third group.

Logic for the flip flops is as follows:

$$S1 = CA_1T_1 + CA_2T_2 + CA_3T_3 + CA_4T_4 + \ldots CA_{20}T_{20}$$
$$S2 = CB_1T_1 + CB_2T_2 + CB_3T_3 + CB_4T_4 + \ldots CB_{20}T_{20}$$
$$SL3 = CC_1T_1 + CC_2T_2 + CC_3T_3 + CC_4T_4 + \ldots CC_{20}T_{20}$$

The numerical designations as well as the number of flip flops are selected for purposes of this description. In the a practical application, the number of independent flip flops connected to each storage flip flop may vary up to the number of bit times in a computer word.

In addition to the write heads 30, 31 and 32 distributed about the storage track 3, read heads 33, 34 and 35 (represented by arrows pointed away from disc 4) are positioned one computer word before the write heads. The read heads are connected to recovery logic 11 comprising interrupt recovery flip flops IR1, IR2, and IR3. The recovery flip flops are connected to a plurality of AND gates 36, 37, and 38 for re-setting the independent flip flops when normal system operation is restored. Each AND gate is gated by a timing pulse from decode logic 23 so that when the information is read from the storage track 3, for example during a recovery mode, it is gated to the flip flop from which it was stored by means of a timing pulse. As a result of using a timing pulse to store a flip flop state and a timing pulse to reset the flip flop to its state just prior to the time it was interrupted normal operations can be resumed without unnecessary delays or errors.

Buffer logic 20 is provided between the gates 36–38 and certain of the flip flops to provide a timing delay in the recovery mode as will be explained subsequently. The buffer logic 20 is connected to flip flops comprising the independent flip flops 21.

Timing control logic 17 is connected to Recovery Mode Control Logic 18, storage logic 2 and other portions of the system for synchronization of system operations. Logic for the TP flip flop and the T24 gate used in synchronizing the counter 39 is,

1TP=SPX ILB
1T24=T23 TP′ SPX′

Other logic used for implementing the bit counter is well known to those skilled in the art. As the flip flops change states, the count advances from TP to TX and TO through T24 in synchronism with the corresponding bit positions on its disc 4. The logic 17 includes seven bit counter 39 mechanized by flip flops B1 through B7 and and decode logic gates 23 for decoding the count and generating timing pulses consistent with the count. In addition, the timing control logic 17 includes control logic 22 comprising flip flop TP and primary gate T24 which are responsive to signals received after an interruption for properly setting the bit counter 39.

In addition to the storage track 3, the disc 4 also comprises synchronizing pulse storage track 10 having write heads 7 and 7′ and read head 8 disposed about the disc.

Figure 2:
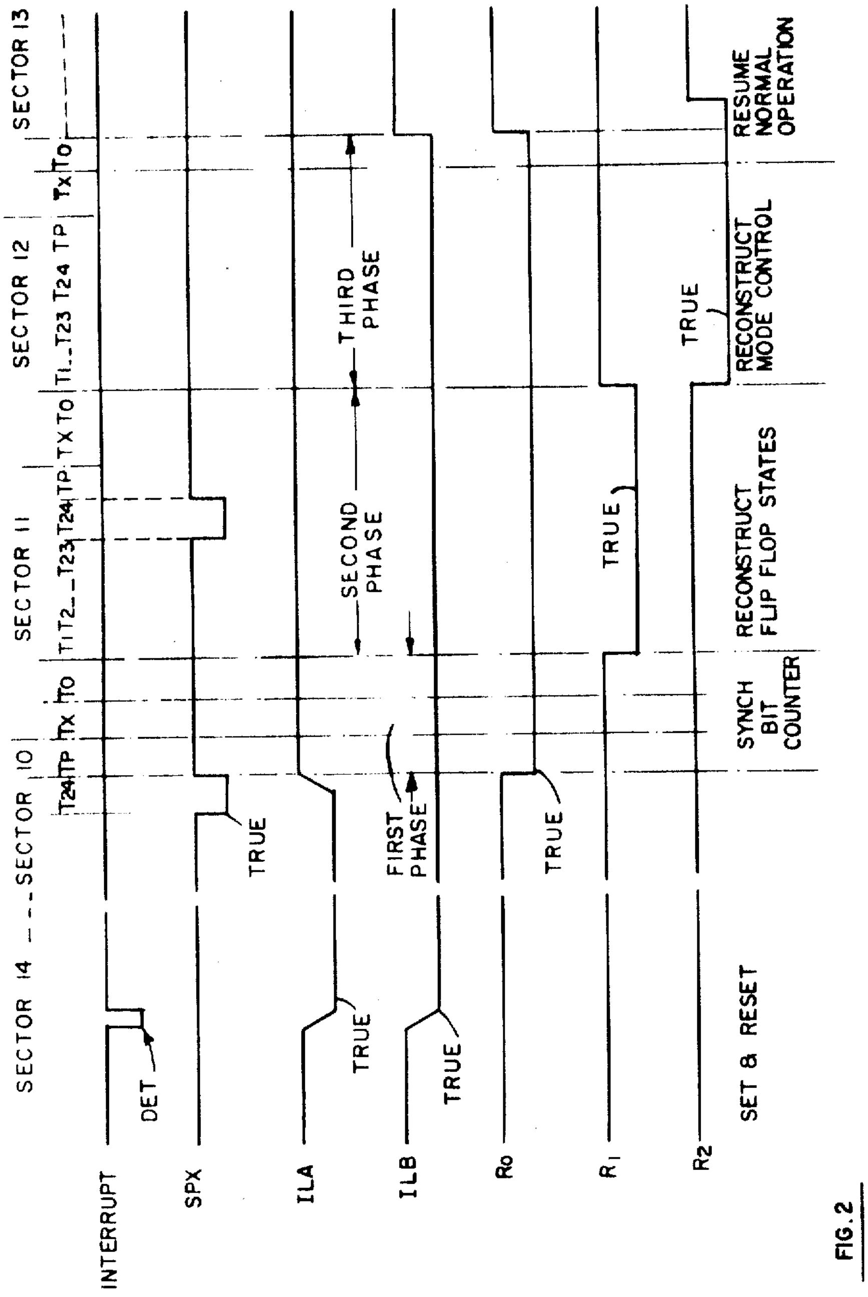
FIGURE 2 illustrates a plurality of curves showing the timing cycle for the recovery of the computer after an interruption.

At TO time of the computer word in which the states of the independent flip flops are stored, a sync pulse generated by the SP flip flop 40 is stored on track 10 of disc 4. The pulse is written on the track by write head 7′. As shown in FIGURE 2, the TO pulse occurs just prior to T1 time of the computer word in which the states of the flip flops are restored during the recovery mode of system operations as described subsequently.

Figure 3:
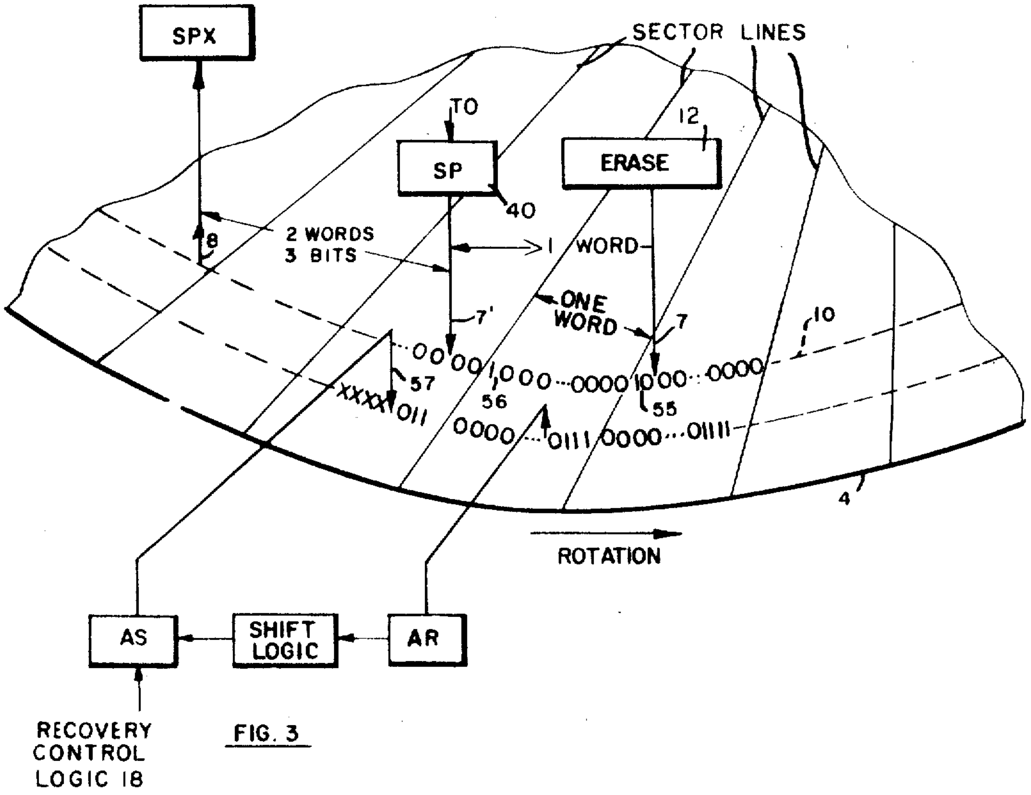
FIGURE 3 is an illustration of a portion of a disc memory including a recirculating register and a sync pulse track.

During each word time, the sync pulse is written approximately two words before it is erased by special write head 7′ connected to erase logic 12, as shown in FIGURES 1 and 3. The spacing between the write head connected to the SP flip flop and the special write head 7, insures that at least one sync pulse exists on the sync track 10 at all times, and that no pulses reach the read head 8 prior to an interruption. Since old sync pulses are erased after approximately two words, the one or two remaining sync pulses indicate the existence of valid flip flop data recorded in the storage loops track 3.

When a transient condition occurs and causes an interruption or interference with normal computer operations, the sync information is retained by disabling the erase action of write head 7′. As a result, the stored pulse rotates with the disc 4 to the sync pulse read head 8 for initiating recovery. The sync pulse is read at a position on the disc 4 which is approximately two word times and three bit times earlier than when it was written (see FIGURE 3). A word time may be defined as the period in which the counter counts from a minimum to a maximum. The head 8 is connected to sync pulse read flip flop SPX which forces the counter 39 to assume a count consistent with the track location of the pulse.

Detector means 13 is connected to disable logic 9 to inhibit the erase logic 12 whereby the storage flip flops of the system are disabled from writing when normal computer operations is interrupted or interfered with by transient conditions, etc. FIGURE 1 illustrates an output between the disable logic 9 and the storage flip flops S1 through S3 in addition to an output to erase logic 12. Since the writing is disabled, the read heads of the disc can read the information from the read heads into recovery logic 11 after an interrupt condition has terminated. The detector may comprise circuitry well known in the art for sensing temperature, radiation, shock, etc.

Interrupt logic 13 comprises ILA and ILB flip flops having their logic 1 inputs connected to the output from detector 13 (DET). The output of the detector 13 may be in the form of a pulse as shown in FIGURE 2 which has a true period (negative level) consistent with the length of the interrupting condition. The logic 0 input to the ILB flip flop is generated by AND gate 47 of recovery control logic 18. The logic 0 input to the ILA flip flop is the logic 1 output of the SPX flip flop described subsequently. Logic for the flip flops is shown below as,

1 ILA=DET
0 ILA=SPX
1 ILB=DET
0 ILB=$(R_0R_1{}'R_2T0)(ILA')$

The logic 1 output of the ILA flip flop provides a control signal to the recovery control logic 18 through AND gate 46 when the logic 1 output of the SPX flip flop is true and a control signal to the recovery control logic 18 through AND gate 48 when the logic 0 output on the SPX flip flop is true. The logic 0 output of the ILA flip flop provides a separate control signal to the AND gate 47 of the recovery control logic 18 when the input represented by $R_0R_1{}'R_2T0$ is true.

The logic 1 output of the ILB flip flop provides a control signal to the TP flip flop of timing control logic 17 through AND gate 45 when the logic 1 output of the SPX flip flop is true. The logic 1 output of the ILB flip flop also provides an input to OR gate 44 to control disable logic 9. The logic 0 output of the ILB flip flop enables write and erase flip flops in the computer at the end of the recovery mode as described subsequently.

After the transient effects to the circuits have decayed, the flip flops of the computer would assume random states if nothing set them to a particular configuration. In order to prevent a random configuration and to force the computer to resume a normal operation after an interrupt condition, a flip flop ILA one sets or zero sets certain dependent flip flops. In other words, by an inspection of the logic, it can be determined that certain flip flops and primary gates must be zero set or one set before the beginning of a recovery mode. For example, if the computer was in the compute mode, ILA would set the necessary flip flops and primary gates to place the computer in the compute mode after the recovery. If the computer comprised part of a missile system in flight, certain flip flops would be set to a flight mode.

If an interrupt condition had been detected, for example, at $T_2$ time of sector 14, a sync pulse could be read by the SPX flip flop at $T_{24}$ time of sector 11 as shown in FIGURE 2. However, since the erase head 7 of the sync pulse track 10 is spaced in excess of one word time from the write head 7' (see FIGURE 3), the previous sync pulse from sector 13 would not have been erased. As a result, the sync pulse would be read at $T_{24}$ time of sector 10. The spacing between the erase head and the write head must be more than one word because as a practical matter, it becomes difficult to properly position the head with respect to the sync track. If an exact one word positioning scheme could be maintained it would be desirable. However, if misalignment occurred a sync pulse could be erased before a new sync pulse was written. If one sync pulse is erased before a new sync pulse can be written, and the computer is disabled during that period, there would be no reference pulse to synchronize the recovery mode after the interrupt period. As a consequence, the spacing is more than one word (one word) as shown in FIGURE 3. The two word, three bit spacing between the write head 7' and read head 8 of the sync track 10 (see FIGURE 3) provides sufficient time after recovery has begun to properly set all the flip flops and initiate computer operation so that when $T_1$ time of sector 13 for the example given, occurs, the computer is ready to resume normal operation.

As shown in FIGURE 2, when an interrupt pulse is generated, flip flops ILA and ILB are set true. When SPX is true, the flip flops of the bit counter are forced to the correct state within two bits (TP and TX) after the SPX pulse. The delay is due to the use of natural dependent relationships in the counter logic for the embodiment described. Thus special sync control is required only on two of the counter flip flops.

Recovery control logic 18 is also re-set by the SPX pulse. The logic comprises flip flops R0, R1, R2 and associated gates for the particular embodiment described. As shown by the signals in FIGURE 2 when an interrupt pulse is generated a sequence of events is initiated. This sequence comprises the interrupt mode and the recovery mode. The interrupt mode is initiated directly by setting the logic 1 output of the Interrupt Logic flip flops ILA and ILB true.

1 ILA=DET
1 ILB=DET where DET is the interrupt pulse from the detector.

ILA provides interrupt control to the computer logic while ILB interrupts the memory writing operations. The interrupt mode is denoted by ILA and ILB, both true.

During the interrupt mode, the dependent computer flip flops (not shown), as well as certain independent flip flops, are set to a correct logical state so that they can be properly re-set during the recovery mode. In other words, certain of the flip flops are required to be zero set so that when the stored information is received, they can be set to a logical one. Inasmuch as the ILA flip flop is true during the interrupt period, its true state is used to set the dependent flip flops primary gates of the system to a logic 0 state. In FIGURE 1, an output is indicated for that purpose. The logic of a particular system can be examined to determine which of the flip flops as previously described, requires setting during this period.

The recovery control flip flops, R0, R1 and R2, are logically set to a zero state before the computer enters the first phase of its recovery mode. Logic for setting the flip flops is shown as follows:

0 R0=SPX' ILA
0 R1=R0'
0 R2=R0'

The computer remains in the interrupt mode so long as the ILA flip flop remains on. When a sync pulse is read by the SPX flip flop, the SPX flip flop is one set and the interrupt mode is terminated.

When the ILA flip flop is zero set at the same time that recovery flip flops R1 and R2 are zero set, the first phase of the recovery mode is entered. The first phase may be described as the bit counter synchronization mode, as shown in FIGURE 2. The R0 flip flop is one set to signify beginning of the first phase of the recovery mode as shown by the following logic,

1 RO=SPX ILA

The bit counter 39 is synchronized by the outputs from the TP flip flop and the primary gate T24 as described previously.

When the logic 1 output of the $R_1$ flip flop is set true the computer enters into the second phase of the recovery mode which may be defined as the flip flop reconstruction mode. Logic for setting the R1 flip flop is $1R_1=R_0R_1'T0$. The flip flop states are read from the storage tracks and loaded into the appropriate flip flops through recovery logic 11. As previously indicated, some of the flip flops may be buffered through flip flops comprising part of the buffer logic so that the computer operation can properly begin after all the flip flops have been read from storage. After one word time, the recovery mode advances to the third stage which is defined by one setting R2 and zero setting R1. The final phase is defined in accordance with the following logic:

0 R1=R0R1T0
1 R2=R2R1R0T0

This state remains for one word time during which several dependent flip flops are set. Some of the independent flip flops which were stored in buffers are transferred to their proper flip flops, and the disc turns to the desired position for recovery of the recirculation loops. At the following T0 the recovery is complete. ILB is turned off thus enabling memory write and erase currents and R0 is turned off thus disabling the recovery logic.

0 R0=R0R1'R2ILA'T0=0ILB
0 R2=R0'

This action occurs at a T0 time which is equivalent, in disc position, to the T0 time which occurred before the interruption. Therefore, the information recorded between the read and write heads of the recirculating loops is accurately restored. The recovery of the recirculating loop data makes use of storage which occurs as a result of the information passing under the read head of the loop and into a space where it is not recoverable except by disabling the writing as in the interrupt case being discussed.

Operation of a typical recirculation register within a computer system is shown in FIGURE 3. The A register comprises the read flip flop AR, the storage flip flop AS, and shift logic, read head and write heads. The read and write heads are depicted by arrows. For this description the A register is shown in the process of shifting its contents to the right. The data contained in the magnetic storage medium is shown as one's and zeroes in FIGURE 3. The sector lines are shown for convenience in delineating the computer words on the disc 4. A computer word length of 24 bits is assumed for purposes of this description. Certain of the bits have been replaced by dots. As the disc rotates in a counterclockwise direction the previous contents of the A register rotate past the read head 65 in the direction of rotation. In normal recirculation the information is lost because in completing the revolution it would encounter a write head prior to a read head. If, however, an interruption occurs the write head is disabled by the output from AND gate 58 of the recovery control logic 18, so that the contents of the A register may be read after a disc revolution.

The sync track and recovery mode control logic 18 are so arranged, as described above, that the write head 57 is enabled (R0′ set true) at exactly the time that the information between the read and write heads of all recirculating loops is in the same position as it was when the sync pulse was stored, i.e. before the interruption. For example, if an interruption occurs at the time depicted in FIGURE 3, the register is in the process of shifting from the pattern 0000 . . . 0111 stored in one sector to a pattern of 0000 . . . 0011 for storing at a preceding sector. There are two valid sync pulses on the sync track. The first one designated by numeral 55 will be used in the recovery process. The other sync pulse designated by numeral 56 is not used since the system will be in the recovery mode before it is read. Thus the recovery will cause the computer to "back up" and start with the A register contents of 0000 . . . 1111 in the sector which stores the sync pulse 55. It is noted that the states of all the flip flops will be recovered for that same word time so that the shifting operation from 0000 . . . 1111 to 0000 . . . 0111 will be repeated after recovery. The contents of other recirculating registers may similarly be recovered, or stored, after an interruption. The logic of a particular system could be examined so that the exact number of recirculating registers involved could be determined.

Although the invention has been described and illustrated in detail, it is to be understood that the same is by way of illustration and example only, and is not to be taken by way of limitation; the spirit and scope of this invention being limited only by the terms of the appended claims.

We claim:

1. A system for restoring a computer to the operating condition it was in immediately prior to a detected condition which interfered with the normal operating condition of the computer, said computer using computer words having bit times for timing and synchronizing pulses, said system comprising:

means for storing the logical states of selected flip flops during each computer word time including means for storing a synchronizing pulse at the beginning of each computer time in which said states are stored, means for erasing the stored synchronizing pulse after the next succeeding pulse has been stored, means for detecting said interfering condition, means responsive to said detecting means for disabling the erase means, means responsive to the synchronizing pulse which was stored immediately before said erase means was disabled for re-storing said selected flip flops to their logical states following an interruption.

2. The combination as recited in claim 1, wherein said means for disabling includes means for detecting a computer interruption.

3. The combination as recited in claim 1, wherein said logical states are stored automatically during each computer word regardless of a detected interfering condition, said flip flops being selected as a function of the number of flip flop states required to restore the computer to its normal operating condition.

4. The combination as recited in claim 1, wherein said computer includes read and write means for writing said logical states into storage and for reading said logical states from storage after a detected interfering condition has ended, and wherein said means for restoring includes timing means for generating a plurality of equally spaced pulses in response to said synchronizing pulse for re-storing the flip flops to their logical states whereby normal operation is resumed at the timing interval the computer was at prior to the detected interfering condition.

5. The combination as recited in claim 1, wherein said means for storing includes means for writing into locations of said means for storing and wherein a plurality of storage locations are provided for simultaneously storing the logical states of said selected flip flops during each computer word, said storage locations being connected in series so that the writing means of one storage location erases previously stored information if an interrupt condition does not occur.

6. The combination as recited in claim 1, wherein the system includes recirculating register means having contents and means are included for recovering the contents of the recirculating register means after an interruption occurs by synchronizing re-writing of the contents of the recirculating register into the recirculating register with said synchtronizing pulse.

References Cited

UNITED STATES PATENTS

| | | | |
|---|---|---|---|
| 3,289,174 | 11/1966 | Brown et al. | 340—172.5 |
| 3,337,854 | 8/1967 | Cray et al. | 340—172.5 |
| 3,351,914 | 11/1967 | Stone | 340—172.5 |
| 3,386,083 | 5/1968 | Geller et al. | 340—172.5 |

OTHER REFERENCES

IBM–7080–Data Processing System, Reference Manual A 22–6560–1 (December 1961), Poughkeepsie, New York, pages 14–19.

PAUL J. HENON, Primary Examiner

H. E. SPRINGBORN, Assistant Examiner